(12) United States Patent
Obara et al.

(10) Patent No.: US 6,229,237 B1
(45) Date of Patent: May 8, 2001

(54) SPINDLE MOTOR

(75) Inventors: Rikuro Obara; Seiichi Matsuura, both of Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 09/469,270

(22) Filed: Dec. 22, 1999

(30) Foreign Application Priority Data

Sep. 3, 1999 (JP) ................................. 11-249975

(51) Int. Cl.[7] ............................. H02K 7/08; H02K 21/12

(52) U.S. Cl. ......................... 310/90; 310/156; 310/216; 310/254

(58) Field of Search ................................. 310/156, 216, 310/254, 162, 90; 360/78, 13

(56) References Cited

U.S. PATENT DOCUMENTS 5,689,147 * 11/1997 Kaneda et al. ..................... 310/216

* cited by examiner

Primary Examiner—Nestor Ramirez
Assistant Examiner—Judson H. Jones
(74) Attorney, Agent, or Firm—Oliff & Berridge, PLC

(57) ABSTRACT

Between rotation shaft 1a and the frame 4, two bearings 5 having inner races 5b narrower in width compared with outer races 5a are disposed and each of end faces of outer races 5a is made to abut each other. Since in general, the outer race and the inner race are secured in the size precision, by making each end faces of the outer race to abut each other, an assembling precision between two bearings 5 is secured. Further, spacing secured between inner races 5b enables to displace the inner ring 5b minutely due to the preload to be given to the end face of the inner races 5b at the time of assembling of the spindle motor, which is expected to absorb a minute play inevitable to the bearings, as a result to increase the rotation precision after completion of the spindle motor.

13 Claims, 5 Drawing Sheets

SPINDLE MOTOR

BACKGROUND OF THE INVENTION

1. Field of the Invention

This invention relates to a spindle motor suitable for driving a disk for such as hard disk drive.

2. Conventional Art

FIG. 5 shows a sectional view of the gist of a spindle motor for driving a disk of an information recording medium such as a hard disk drive. This spindle motor is formed by making a hub 1 i.e. a rotor as a disk face. Further, it comprises a rotary shaft 1a formed in a unitary manner with the hub 1, and on the inner wall of the hub 1's outer circumference cylinder portion a magnet 2 is mounted. The rotary shaft 1a is supported on a frame 4 through two bearings 5 (radial ball bearing). At a position opposing to the magnet 2 of the frame 4, a stator 3 is fixed, which supports a coil 3a. The above spindle motor is a so-called a "shaft rotation type" of spindle motor in which the hub 1 and the rotary shaft 1a are supported by the bearing 5 and rotate in a unitary manner.

In the information recording medium, in order to carry out reading and recording correctly, it is indispensable to form a mechanism in which a head as a recording and reading means can trace a track of a disk. Accordingly, to a spindle motor to drive a disk a high precision of rotation is required. Further, also in order to secure an anti-shock, it is necessary to have a sufficient rigidity. As one of countermeasures, it has been in general to use two bearings 5 for pivoting the rotary shaft 1a of the hub 1.

Further, in order to carry out positioning at the time of an assembling process for two bearings 5 on the spindle motor correctly, a spacer 8 is disposed between the bearings 5. Since this spacer 8 is disposed in such a manner as it abuts to the outer race 5a of two bearings 5, between inner races 5b of the two bearings 5 spacing corresponding to the thickness of the spacer 8 is formed. This spacing contributes to give a preload to the two bearings 5. Such preload is, by giving to the inner race 5b of the two bearing 5 a given preload in such a manner as these come close each other, adapted to press the inner race 5b, ball 5c, the outer race 5a and the spacer 8 with each other to absorb a minute play of the bearing 5 which is inevitably generated at the time of working it precisely. Accordingly, by giving preload the rotation precision of the spindle motor is further increased and further suitable as a spindle motor for driving a disk. Further, FIG. 6 shows an example in which a spacer 4a is formed with the frame 4 in a unitary manner.

That is, as one means so as to secure the rotation precision and the rigidity of the spindle motor, it is quite effective that the spacer 8 or 4a are provided between the two bearings 5. However, such a structure has been a hindrance from the viewpoint that the height of the spindle motor is to be made lower (that is, to promote to make the spindle motor miniaturized).

Although the miniaturization of the spindle motor is a times demand, in order to attain the object, if the spacer 8 or 4a is omitted, the inner race each other and outer race each other of the bearing 5 are contacted close to make impossible to give preload. Accordingly, a minute play of the bearing 5 which is inevitable for working precision can not be absorbed to cause the rotation precision of the spindle motor to be lowered. Further, in order to make the bearing 5 itself, it has been possible to replace the bearing 5 with sintered and oil impregnated bearing or thrust ball bearing, but it has been difficult to secure a given rotation precision.

The present invention is to provide a spindle motor, and the object of the present invention is, while securing a rotation precision and rigidity, to promote to miniaturize the spindle motor.

In order to solve the above problem, according to a first aspect of the present invention, two bearings are disposed while abutting each other between a rotation shaft and a frame, wherein, without disposing a spacer, spacing at least between the outer races or the inner races is formed to make use of said spacing for giving preload to the bearing.

Generally, in the outer and inner races, since high precision has to be secured in high precision in sizing, by abutting two bearings a precision of assembling two bearings is secured. In thus abutting status, when making spacing between the outer races or the inner bearings, because any spacer is not disposed between bearings, the height of the spindle motor is held low. And, when assembling the spindle motor, if a preload force is applied to a race (outer or inner race) which has the aforementioned spacing, a tiny displacement caused by the preload become possible to absorb the minute play inevitable to the bearing to increase the rotation precision of the spindle motor after completion.

Further, according to a second aspect of the spindle motor of the present invention, in a shaft rotation type of spindle motor, between the rotation shaft and the frame, two bearings the inner race of which is narrower in width compared with the outer race are disposed, the end face of each outer race is made to abut, and each end face of the inner race is given by a preload.

According to the present invention, by abutting of each end face of the outer race of the two bearings, spacing is formed between the inner races each other due to a narrower width compared with the outer race. As mentioned above, the outer race and the inner race of the bearing are secured high in size precision, so that, due to the abutting of the end face of the outer races, the assembling precision between two bearings is secured. Further, the spacing formed between the inner races enables the inner race to displace minutely due to giving a preload to the end face of the inner race at the time of assembling the spindle motor, thereby it is intended to absorb a tiny play inevitable to the bearing and increase the rotation precision after completion of the spindle motor.

Further, according to third aspect of the spindle motor of the present invention, in the shaft rotation type of spindle motor, between the rotation shaft and the frame, two bearings the outer race of which is narrower in width compared with the inner race are disposed, the end face of each inner race is made to abut, and each end face of the outer race is given by a preload.

According to the present invention, by abutting of each end face of the inner race, spacing is formed between the outer races each other due to a narrower width compared with the inner race. As mentioned above, the outer race and the inner race of the bearing are secured high in size precision, so that, due to the abutting of the end face of the inner races, the assembling precision between two bearings is secured. Further, the spacing formed between the outer races enables the outer race to displace minutely due to giving a preload to the end face of the outer race at the time of assembling the spindle motor, thereby it is intended to absorb an tiny play inevitable to the bearing and increase the rotation precision after completion of the spindle motor.

Further, according to a fourth aspect of the spindle motor of the present invention, merely one of two bearings is provided with a difference in width between the inner race and outer race in width, due to such construction too, when the outer race abuts each other, spacing between the inner races is formed, or when the inner race abuts each other, spacing between the outer races is formed. Accordingly, the function as well as the above can be affected Further, according to a fifth aspect of the spindle motor of the present invention, it is what is made by replacing the spindle motor in any one of aspects 2 to 4 with the shaft fixation type of the spindle motor, and according to a sixth aspect of the spindle motor of the present invention, the spindle motor is formed by separating the rotation shaft and the hub.

PREFERRED EMBODIMENTS OF THE PRESENT INVENTION

Hereinafter, some embodiments of the spindle motor of the present invention are explained referring to attached drawings. For reference, same sings are used for the same parts or portions to the conventional art and detailed explanation is omitted.

Figure 1:
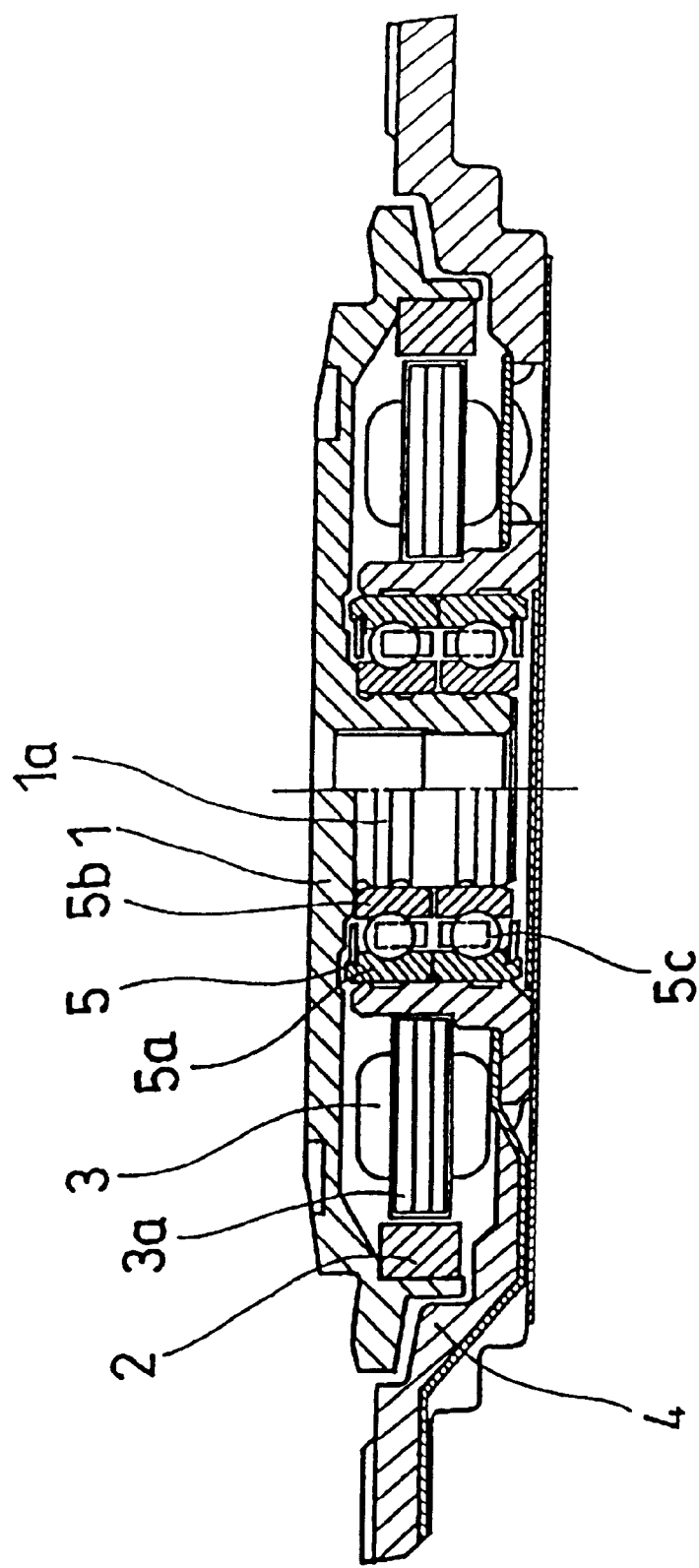
FIG. 1 shows a sectional view of the first embodiment of the spindle motor of the present invention.

FIG. 1 shows a spindle motor for disk driving of the first embodiment of the present invention. In this spindle motor, a hub 1 and a rotation shaft 1a are pivoted on the bearing 5 and rotated in a unitary manner, and therefore, it is called "shaft rotation type" of spindle motor. Further it is what, between the rotation shaft 1a and a frame 4, two bearings 5 having inner races 5b the width of which are narrower compared with the width of the outer race 5a are disposed and each end face of the outer races 5a is made to abut each other. In general, since the outer race and the inner race of the bearing are secured highly in the size precision, by abutting the end face of each outer race, an assembling precision between the two bearings 5 is secured. Further, the spacing formed between the inner races 5b, at the time of assembling a spindle motor, enables the inner race 5b to displace minutely due to the preload given to the end face of the inner race 5b and a tiny play inevitable to the bearing is intended to be absorbed and increase the rotation precision.

Here, it is preferable when making the width of the outer race 5a as A, the width of the inner race 5b as B, that A is made approximately 1.05B to 1.20B. As mentioned above, since the relative position of the two bearings 5 is guaranteed by the size precision of the bearing itself, the difference value of the widths of the outer race 5a and the inner race 5b may be sufficient if a minute displacement to give a preload is secured.

Now, a giving of the preload to the bearing 5 is carried out by so-called "determined position preload method" in which, at the time of inserting the rotation shaft 1a in the inner race 5b, the relative position of the inner race 5b of each bearing 5 to the rotation shaft 1a is corrected. Further, spacing between the rotation shaft 1a and the inner race 5b of each bearing it is fixed by an adhesive or by being pressed.

According to the first embodiment of the present invention, since two bearings 5 are used, a high rotation precision and a high shock resistance are secured. Further, since any spacer (see FIGS. 5 and 6) is inserted between the two bearings 5, it becomes possible to keep low the height of the spindle motor. Accordingly, while keeping the rotation precision and the rigidity of the spindle motor, it becomes possible to promote a further miniaturization. Further, conventionally, due to the unevenness of the size precision of a spacer, there has been a possibility of deteriorating the position precision of the bearing, instead of enhancing, but, in the present invention, such drawback does not occur and it becomes possible to decrease the cost due to the reduction of the number of parts and increase the assembling workability.

Figure 2:
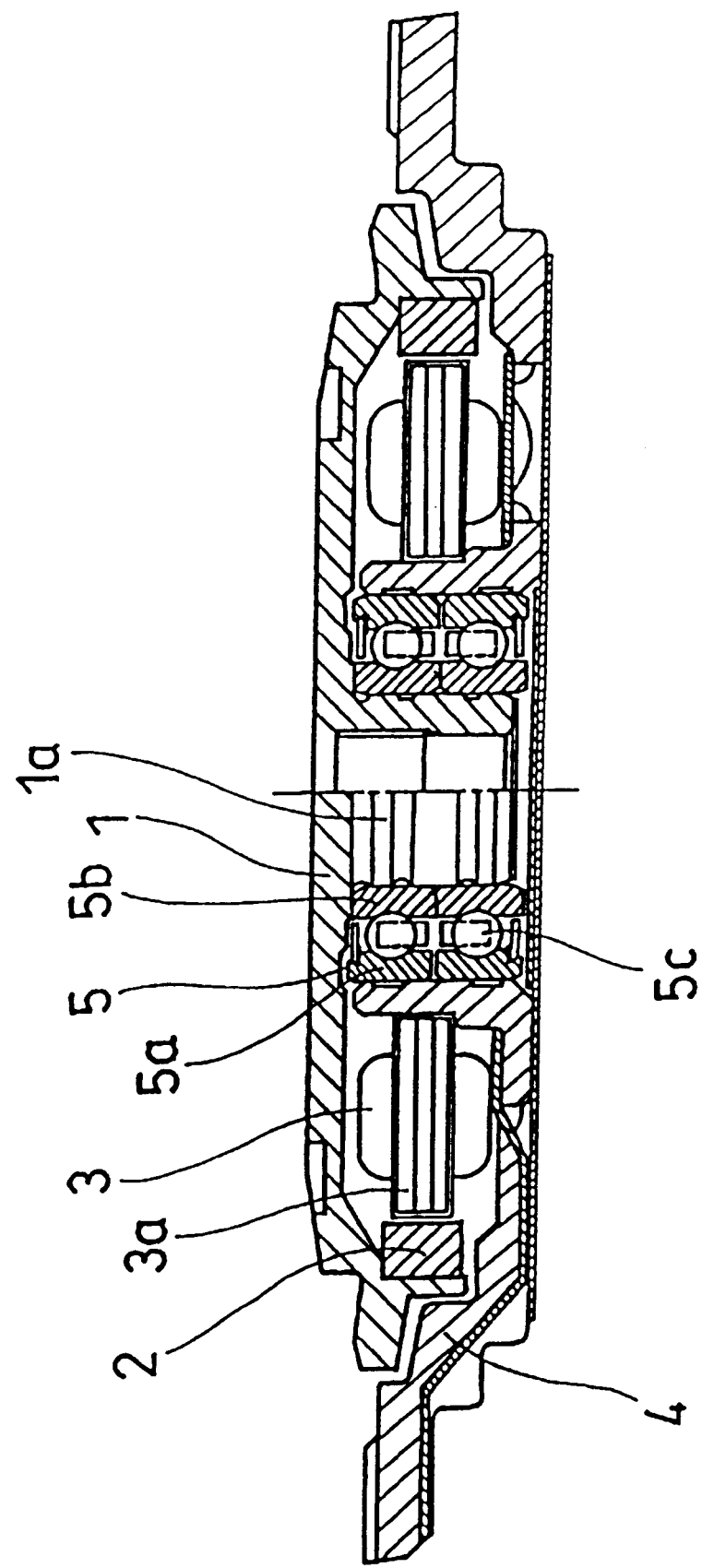
FIG. 2 shows a sectional view of the second embodiment of the spindle motor of the present application.

FIG. 2 shows the second embodiment of the spindle motor for driving a disk of the present invention. The different point from the first embodiment resides in that between the rotation shaft 1a and the frame 4, two bearings 5 having outer races 5a having a width narrower compared with the inner race 5b are disposed and each end face of the inner race 5b abuts each other. The other constitutions are identical with the first embodiment, also obtained effects are same, but this embodiment is one of various kinds of variation, and for that reason it is very effective.

Figure 3:
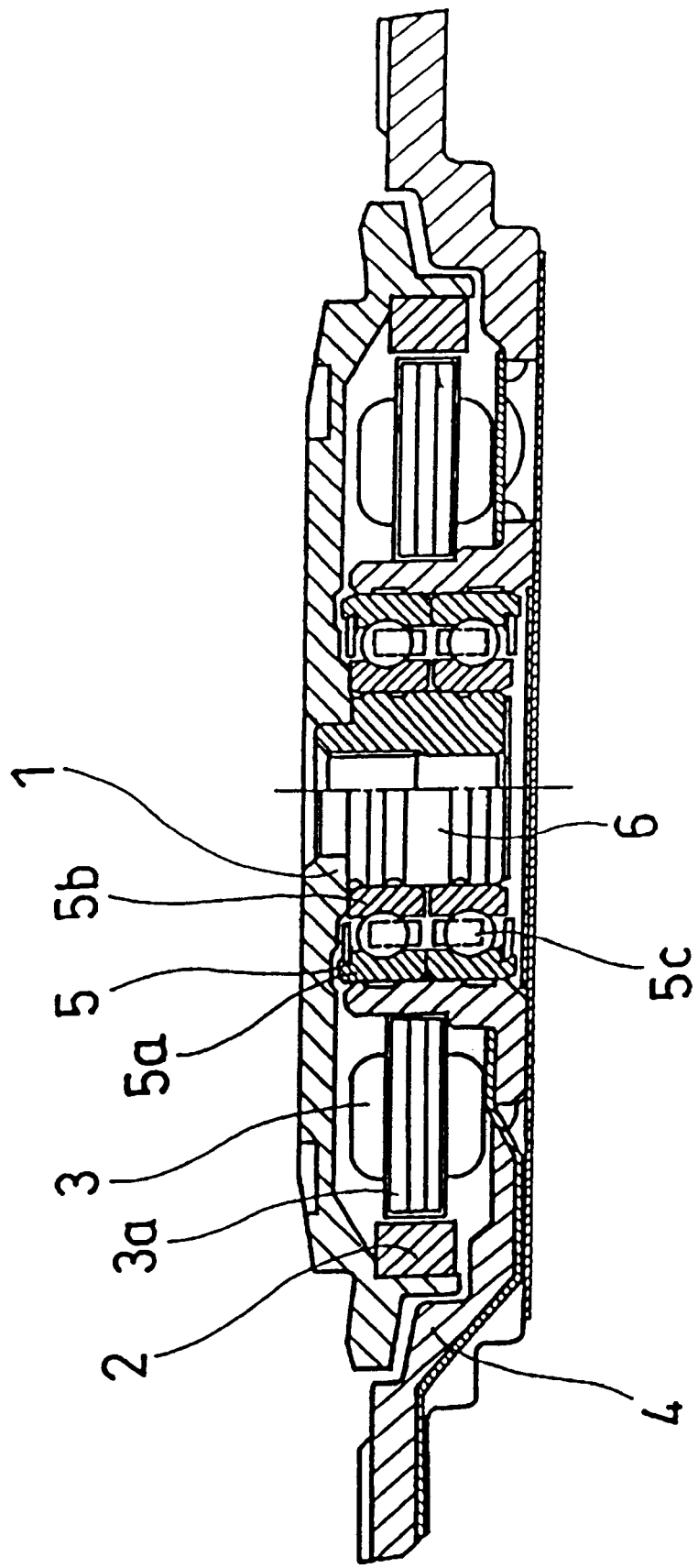
FIG. 3 shows a sectional view of the third embodiment of the spindle motor of the present invention.

FIG. 3 shows the third embodiment of the spindle motor for driving a disk of the present invention. The difference from the first embodiment resides in that the hub 1 and the rotation shaft 6 are formed separately. According to this constitution, at the time of assembling, the assembling process is as follows i.e. the rotation shaft 6 is inserted in the bearings 5, then the hub 1 is fixed on the bearing 6. Accordingly, at the time of inserting the rotation shaft 6 in the inner race 5b, the position relation of each inner race 5b of each bearing 5 to the rotation shaft 6 is easily corrected and size of preload can be controlled in higher precision. The other constitutions are identical with the first embodiment, and the obtained effects are same.

Figure 4:
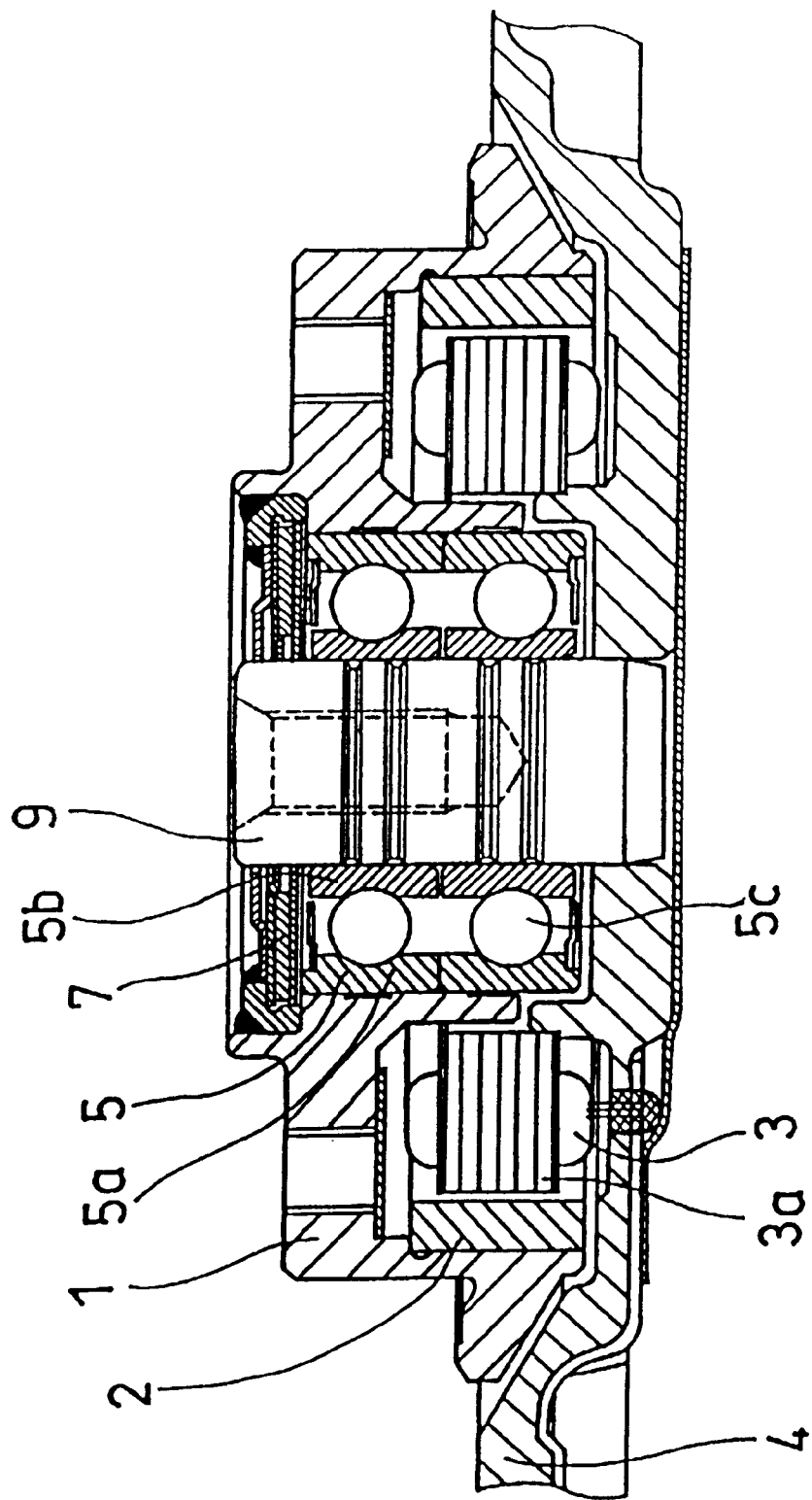
FIG. 4 shows a sectional view of the fourth embodiment of the spindle motor of the present invention.

FIG. 4 shows the fourth embodiment of the spindle motor for driving a disk of the present invention. The difference from the first embodiment resides in that the hub 1 is pivoted on the bearing 9 through the bearing 5, and the hub 1 rotates independently from the shaft 9, which is so-called a shaft fixation type structure. And, between the hub 1 and the shaft 9, a magnetic fluid seal 7 is disposed to prevent the dust powder from getting in and exhausting out of the spindle motor.

Figure 5:
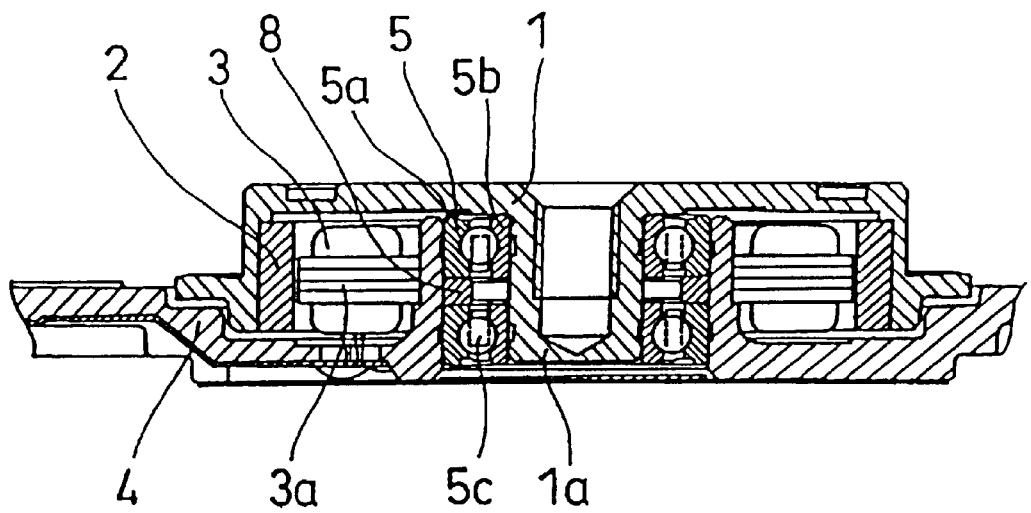
FIG. 5 shows a sectional view of a conventional art.
Figure 6:
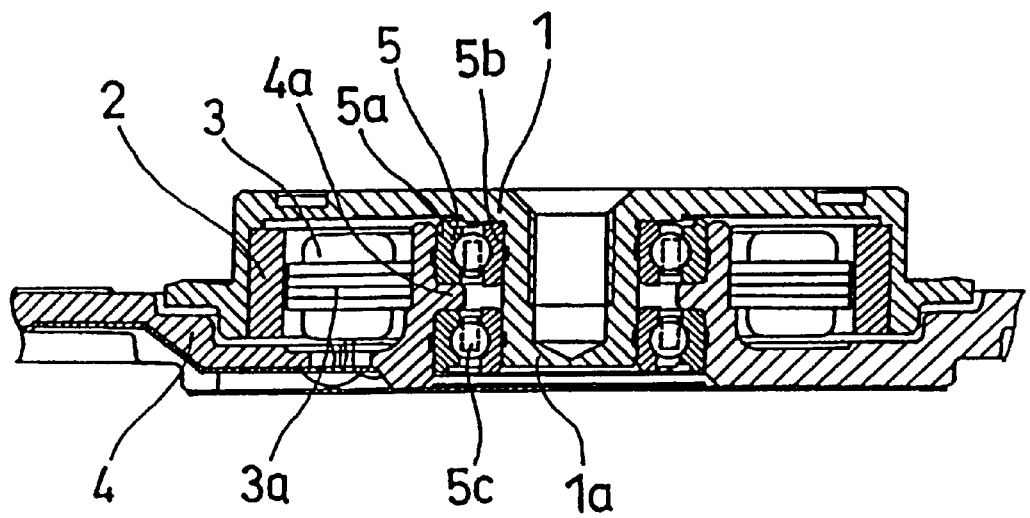
FIG. 6 shows a sectional view of a conventional art.

Further, the spindle motor of the fourth embodiment, as obvious from the conventional examples shown in FIGS. 5 and 6, by disposing two bearings 5 having the inner race 5b having a narrower width compared with the outer race 5a and employing the structure in which each of the end face of the outer race 5a abuts each other, it is possible to give the height which the conventional spacer occupies to the bearing 5. That is, without increasing the height of the spindle motor, by making the bearing large, further resistance ability and anti-shock resistance are intended. Now, in this embodiment too, as well as in the second embodiment, two bearings 5 having the outer race 5a having a width narrower compared with the inner race 5b can be used.

Now, according to the above explanation, although either one of the outer race 5a or inner race 5b has a wider width compared with other is exemplified together with two bearings, in order to obtain the identical effects (each end face of the outer race 5a and the inner race 5b are made to abut, and spacing to give a preload to the bearing is secured), merely one of two bearings may be provided with the difference of the width between the outer race and the inner race. By this structure, it is possible to use a radial ball bearing which has been used conventionally on one of the bearings. In addition, in either one of the above embodiments, the case where it is applied to a spindle motor for a disk drive is illustrated, but the present invention is applied for a spindle motor suitable for another use where a miniaturized and a high rotation precision are required too.

As the present invention is structured as mentioned above, the following effects are expected.

First, according to the first aspect of the present invention, while securing the rotation precision and the rigidity of the spindle motor, a further miniaturization can be promoted.

Further, according to the second and third aspects of the present invention, while securing the rotation precision and the rigidity of the spindle motor, a further miniaturization can be promoted and increase the variation of the bearing structure.

Further, according to the fourth aspect of the present invention, one of two bearings can be applied by the conventional radial ball bearing.

In addition, according to the fifth aspect of the present invention, it is possible to increase the structural variation and control a more high precision, and the size of the preload to give the bearings can be controlled in more high precision.

What is claimed is:

1. A spindle motor comprises two bearings which are made to abut with each other and disposed between a rotation shaft and a frame, wherein, without disposing a spacer between the bearings spacing is formed between outer races or inner races, and said spacing is made to use to give a preload to the bearings.

2. A spindle motor according to claim 1, wherein the hub and the rotation shaft are formed individually.

3. A shaft rotation type of spindle motor comprises, between a rotation shaft and a frame, two bearings having inner race narrower in width than outer race which are disposed, and each end face of the inner races which is made to abut with each other, wherein the spindle motor has the shaft supporting structure to give a preload to each of the inner race.

4. A spindle motor according to claim 2, wherein on merely one of the two bearings, a width difference between the outer race and the inner race is provided.

5. A spindle motor according to claim 2, wherein the spindle motor is made to be a shaft fixation type in place of a shaft rotation type.

6. A spindle motor according to claim 4, wherein the spindle motor is made to be shaft fixation type in place of a shaft rotation type.

7. A spindle motor according to claim 3, wherein the hub and the rotation shaft are formed individually.

8. A spindle motor according to claim 4, wherein the hub and the rotation shaft are formed individually.

9. A spindle motor according to claim 5, wherein the hub and the rotation shaft to are formed individually.

10. A shaft rotation type of spindle motor comprises, between a rotation shaft and a frame, two bearings having outer race narrower in width than inner race which are disposed, and each end face of the outer races which is made to abut with each other, wherein the spindle motor has the shaft supporting structure to give a preload to each of the outer race.

11. A spindle motor according to claim 10, wherein on merely one of the two bearings, a width difference between the outer race and the inner race is provided.

12. A spindle motor according to claim 10, wherein the spindle motor is made to be shaft fixation type in place of a shaft rotation type.

13. A spindle motor according to claim 10, wherein the hub and the rotation shaft are formed individually.

* * * * *